March 16, 1948.  J. E. LOVE  2,438,065
HARVESTING MECHANISM
Filed Oct. 2, 1944  2 Sheets-Sheet 1
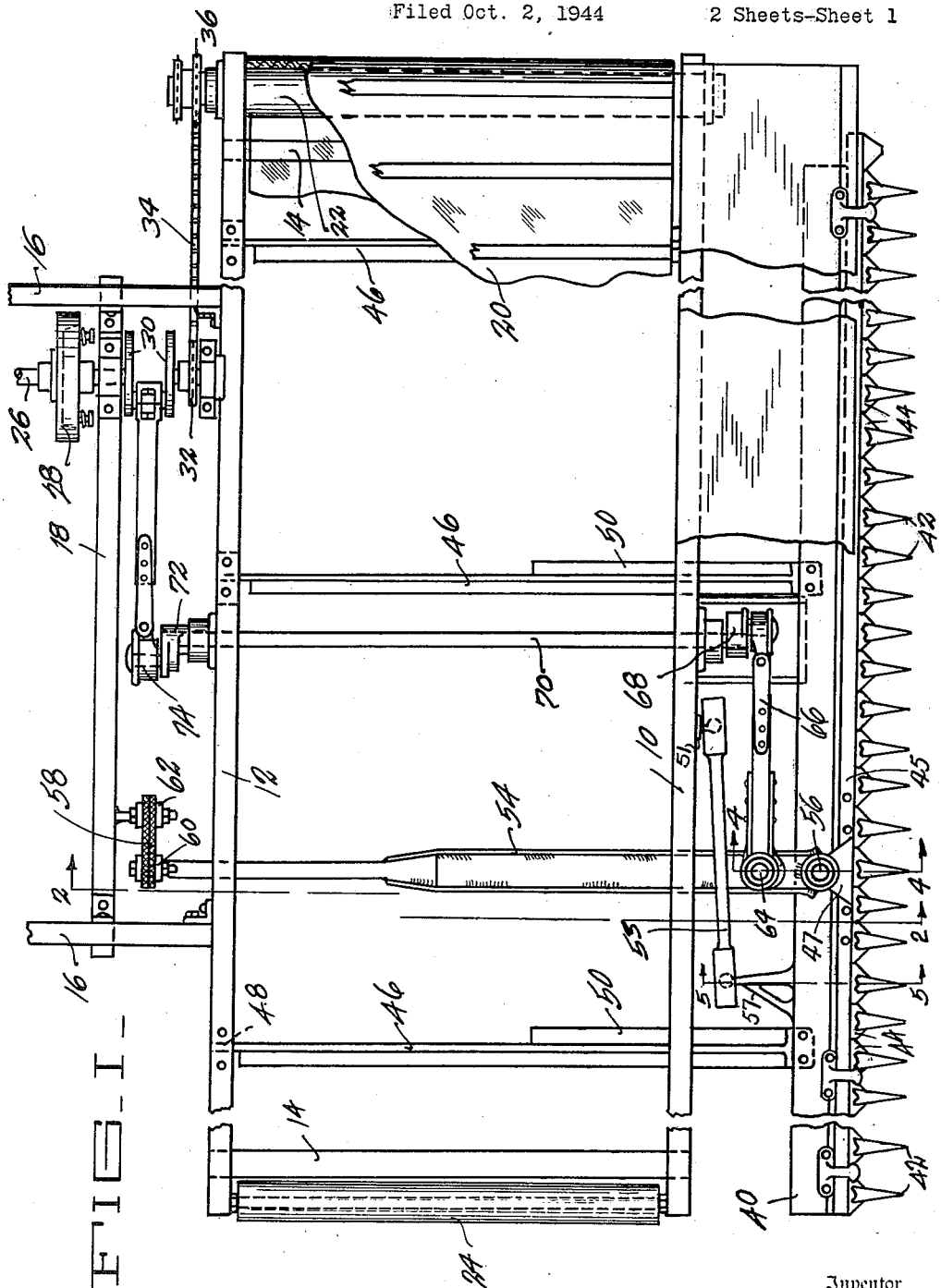
Inventor
James E. Love
By
Herbert E. Smith
Attorney

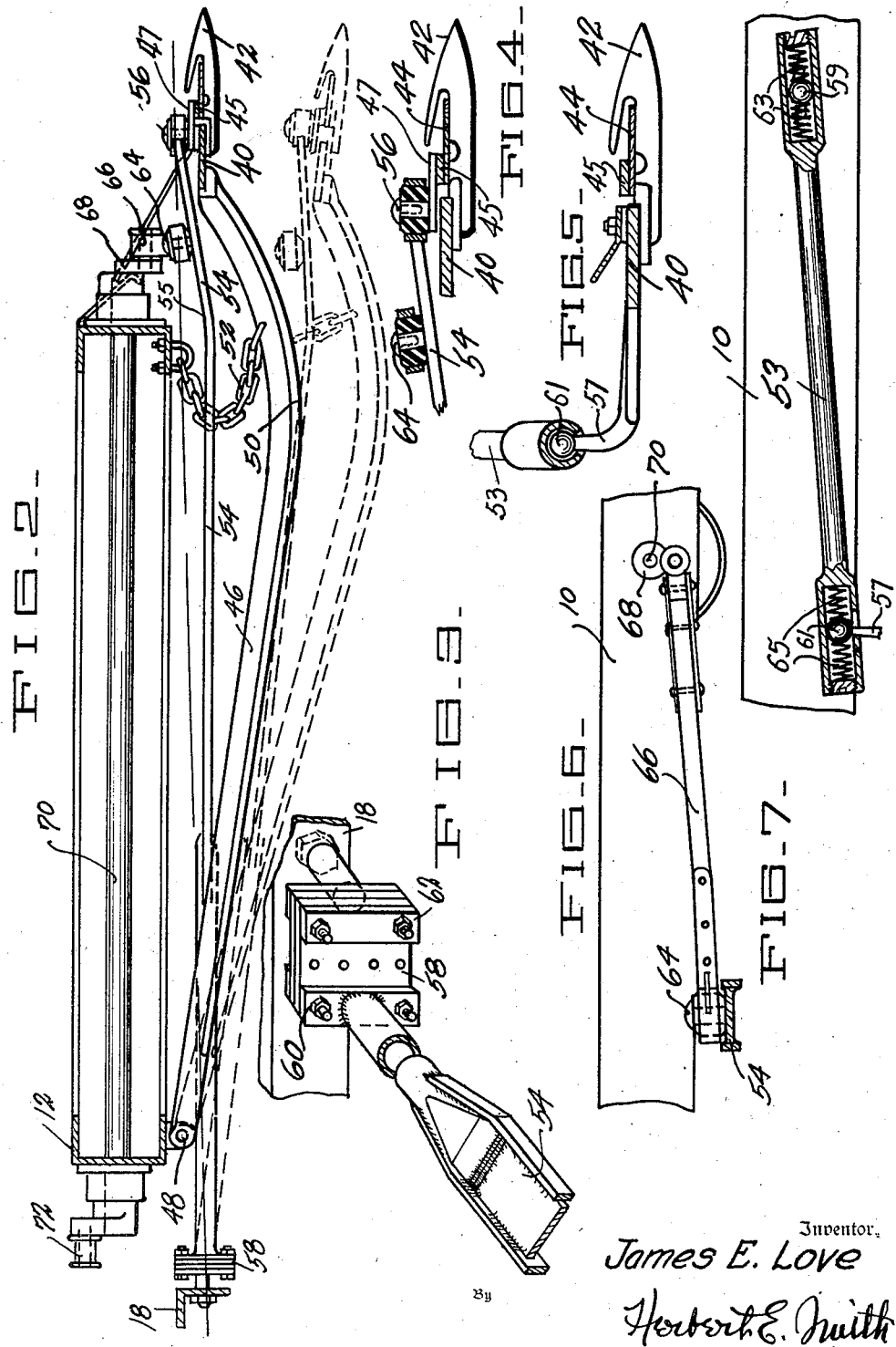

Patented Mar. 16, 1948

2,438,065

UNITED STATES PATENT OFFICE 2,438,065

HARVESTING MECHANISM

James E. Love, Garfield, Wash.

Application October 2, 1944, Serial No. 556,762

4 Claims. (Cl. 56—303)

1

This invention relates to a harvesting mechanism for the cutting of field crops and, more particularly, is a mechanism for reciprocally operating the sickles of push harvesters.

While harvesters that are advanced through the fields ahead of the motive forces employed have long been known in the art of farming, comparatively recently there has been a marked development of such machinery for use with tractors. In the prior art it has been common to mount such mechanism upon wheels and then hitch horses or other prime movers thereto, to push the same but with the weight of the machinery being borne by its own wheels. When these machines are carried upon the wheels or tracks of the tractors now employed the problem is complicated by matters of balance because the harvester, usually much wider than the tractor, is disposed transverse of the path of the tractor and must be kept fairly level with the ground. It is most desirable to eliminate supplemental supporting wheels and to use counterbalancing arrangements that will permit quick and accurate adjustments in these times of high speed harvesting. One of the main factors complicating the problem has been the heretofore normal provision of actuating cranks and pitmans at one end of the sickle. This weighty mechanism is thus off center of the sickle and the harvester is not easily maintained in a substantially horizontal and working position. The problem is further complicated in the case of the "floating cutter bar" devices now well and favorably known for the harvesting of low lying vinous ground crops. In these mechanisms the sickle bar is advanced over the ground only slightly thereabove in a manner conforming to the varying ground contours while the associated crop handling reels and drapers are upwardly and rearwardly disposed in association with an independently supported frame which is in turn carried by the tractor. With such mechanisms, where the sickle actuator is located on the harvester frame at one end, the uniform supporting of the frame is difficult and the whole is unbalanced in an undesirable manner. Thus it can be seen that with a draper frame having a relatively fixed position and a cutter bar that floats and flexes as it passes over the ground; and the two are to be advanced together in a harvesting operation the transmission of reciprocal motion from the frame to the cutter bar in a balanced manner is a problem difficult of solution.

Having in mind the defects of the prior art, it is an object of my invention to provide a centrally

2 located actuator mechanism for cutter bars that float relative a draper frame with which the same is associated without destroying or impairing a balanced supporting of the frame.

Another object of the invention is the provision, in a harvester of the type mentioned, of an oscillator bar for reciprocating the sickle of a floating cutter which bar is flexibly and pliantly coupled to the frame and will operate without bind or undue friction.

Still another object of the invention resides in providing, in a harvester as mentioned, a centrally located oscillator member for the sickle which member has a connection with the frame that permits at least two kinds of motion, such as twisting of the oscillator and endwise movement thereof and swinging movement in two planes at right angles to each other.

One other object of the invention is the provision in a harvester of cutter bar reciprocation means which is easy to construct, simple to operate and will have a long and useful life in the the normal conditions of hard usage to which it is put.

The foregoing objects and others ancillary thereto I prefer to accomplish as follows:

According to a preferred embodiment of my invention, I dispose centrally of a harvester frame an oscillator bar which is flexibly or pliably connected to said frame and mechanically associated with the cutter bar to reciprocate the same through oscillations provided by means carried by the frame all without destroying the balance thereof or interfering with the free floating movement of the cutter bar assembly. Specifically the oscillator bar is located substantially medial of the frame and has a rear flexible connection therewith permitting many kinds of motion of the bar relative the frame such as endwise twisting and swinging movements to accommodate a wide variety of conditions that may be encountered in the field. One form of the flexible connection is obtained by mounting a resilient leaf on the frame and then connecting the bar to the leaf off-set from the point at which the leaf is mounted to the frame. This leaf may be of metal plate or, as shown herein, may be formed of heavy rubberized belting adapted for flexing and twisting as the bar is oscillated as well as swung in any of several directions.

The novel features that I consider characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, in which Figure 1 is a plan view of a harvester with portions omitted for convenience of illustration, Figure 2 is a sectional view in elevation taken on plane 2—2 of Figure 1, Figure 3 is a fragmentary perspective view of the oscillator bar, Figure 4 is an enlarged sectional view taken on line 4—4 of Figure 1, Figure 5 is a sectional view taken on line 5—5 of Figure 1, Figure 6 is an elevational view of the pitman which actuates the oscillator bar, and Figure 7 is an elevational view of a radius rod employed between the harvester frame and the cutter bar with portions shown in section.

A harvesting mechanism to overcome the defects hereinbefore enumerated must have at least two totally distinct characteristics; it must be capable of permitting ground conforming movement of a cutter mechanism without interference with the sickle reciprocation while still being mechanically associated with the relatively fixed harvester frame; and it must also provide a flexible pliant connection for an oscillator bar extending between a substantially immovable frame and a freely movable floating cutter bar. Accordingly, referring to the drawings, the harvester frame comprises the channels 10, 12 positioned in parallelism and rigidly joined at the ends by spacers 14, 14. Extending rearwardly from frame member 12 is a pair of beams 16, 16 which are connected pivotally to a tractor frame and are swingably carried thereby in a manner not shown but well-known in the art. Bar 18 lies to the rear of channel 12 and serves to stiffen the frame as well as carry part of the motive mechanism.

A draper belt 20 is placed around rollers 22, 24 at opposite ends of the frame defined by members 10, 12 and 14. Said belt is caused to endlessly move transversely in harvesting by power from shaft 26 applied through clutch 28, crank 30, sprocket 32, chain 34 and sprocket 36 which latter is coupled with the roller 22.

In advance of the above described frame is a cutter bar 40 having a plurality of sickle guards 42 with respect to which sickle knives 44 reciprocate in crop cutting operations. This cutter bar is advanced over the ground ahead of the frame by bars 46 which are rearwardly and swingably coupled to pivots 48 on the frame and which are forwardly secured to the cutter bar 40. In a mid portion of the bar, the same is curved and has ground engaging shoes 50 which insure that the cutter bar is positioned slightly above the ground surface. A chain 52 limits undue downward movement of these shoes relative the frame. A radius rod 53 is resiliently connected at its ends between frame member 10 and the cutter bar. Two brackets 51 and 57 on the frame 10 and cutter bar respectively have round knobs 59 and 61 thereon that are seated between pairs of springs 63 and 65 in the hollow ends of the rod 53. The hollow ends have slots through which the brackets extend to allow limited endwise movement of the rod. This connection is provided to permit raising and lowering movement of the cutter bar without undesirable lateral movement.

The sickle knives 44 are riveted on a sickle bar 45 that is mounted in the cutter bar 40. Between its ends the sickle bar has a plate 47 fixed thereon. This plate carries a pivot pin 56 by which power is applied to reciprocate the sickle bar.

An oscillator bar 54, slightly curved at 55, is pivoted on the pin 56 and extends between the sickle bar pin 56 forwardly of the machine and the rear flexible leaf 58 to which it is secured by clamps 60. Leaf 58 is similarly engaged by clamps 62 which are securely joined to the frame member 18. Preferably leaf 58 is flexible, pliant and resilient and, while it may be formed of suitable metal plates, I have found that it is easily and practically formed of layers of heavy rubber-impregnated belting which permits flexing, twisting and bending without material fatigue or wear. The oscillator bar lies under the draper frame and, near its forward end, has a pin 64 for engagement by pitman 66 by which oscillatory motion is transmitted from the crank 68 on the forward end of shaft 70 suitably journalled fore and aft in the frame members 10, 12. On its rear shaft 70 has a crank 72 and pitman 74 connects the same to crank 30. To accommodate the movements of the various parts in the raised and lowered positions of the cutter bar relative the frame the various joints of the pitman with the oscillator bar and the radius rod with the cutter bar and draper frame, resilient and distortable bushings and other mounts are shown throughout the drawings.

It will be seen that real advantages are gained by my arrangement in the operation of the reciprocal cutter means in its many positions relative the frame from which reciprocal motion is supplied. It will also be seen that my arrangement permits the medial positioning of the oscillator means for the reciprocal cutter elements without detracting from the free floating of the same. Since members 18 and 12 are positioned rigidly together, when the cutter bar drops and the push bars 46 swing downward any bind or twist on the oscillator bar is absorbed or accommodated by the resilient leaf 58 which twists or flexes without harm and can, nevertheless, still be pivoted due to the bar's oscillation as moved by pitman 66.

I have mentioned that bar 54 is slightly bent at 55; this permits the cutter bar to raise to an extreme upper movement with respect to the draper 20 and still make it possible to maintain the connection with the pins 56 and 64 and the pivot 48 aligned and therefore less subject to twisting or disalignment strain.

While I have shown and described particular embodiments of my invention, it will occur to others skilled in the art that various changes and modifications may be made without departing from the invention, and I, therefore, aim in the appended claims to cover all such modifications as fall within the true spirit and scope of my invention.

Having thus described my invention, I claim:

1. In a harvesting mechanism, a frame to be advanced over the ground, a cutter bar including reciprocal cutting means positioned in advance of said frame, means associated with said cutter bar to support the same relative the ground, bar means extending rearwardly from said cutter bar to pivotal connection with said frame whereby the cutter bar may swing about said pivotal connection and have vertical movement of said frame, an oscillator bar operatively connected forwardly to said cutting means and extending rearwardly therefrom to a connection with said frame, said connection including a pliable member secured to and extending transversely to the axis of the oscillator bar and secured to the frame at a point spaced horizontally from the bar, and means for oscillating said oscillator bar.

2. In a harvesting mechanism, a frame to be advanced over the ground, a cutter bar including reciprocal cutting means positioned in advance of said frame, means associated with said cutter bar to support the same relative the ground, bar means extending rearwardly from said cutter bar to pivotal connection with said frame whereby the cutter bar may swing about said pivotal connection and have vertical movement independent of said frame, an oscillator bar operatively connected forwardly to said cutting means and having a rear flexible connection with said frame, said connection comprising a leaf of flexible pliant material extending horizontally in a direction transverse to the oscillator bar and fixed to the frame at a distance horizontally from its connection to the bar whereby to permit endwise and swinging movement of the bar but substantially preventing lateral shifting of the attached end of the bar in the horizontal direction in which the leaf extends from the bar, and means for oscillating said oscillator bar.

3. In a harvesting mechanism a frame to be advanced over the ground, a cutter bar including reciprocal cutting means positioned in advance of said frame, means associated with said cutter bar to support the same relative the ground, bar means extending rearwardly from said cutter bar to pivotal connection with said frame whereby the cutter bar may swing about said pivotal connection and have vertical movement independent of the frame, an oscillator bar forwardly connected to said cutting means and extending rearwardly therefrom to flexible connection with said frame, a pitman connected to said oscillator bar intermediate said forward and rearward connections and means for reciprocating said pitman, said flexible connection of the oscillator bar with the frame being at a different distance from the cutter bar than the pivotal connection of the bar means with the frame, and including a resilient connecting member yieldable endwise of the bar and substantially non-yielding in a plane perpendicular to the bar.

4. In a harvesting mechanism, a frame to be advanced over the ground, a cutter bar including reciprocal cutting means positioned in advance of said frame, means associated with said cutter bar to support the same relative the ground, bar means extending rearwardly from said cutter bar to pivotal connection with said frame whereby the cutter bar may swing about said pivotal connection and have vertical movement independent of said frame, an oscillator bar operatively connected forwardly to said cutting means and extending rearwardly therefrom, a pliant leaf mounted upon said frame and connected with the rear of said oscillator bar offset from said mount to the frame, and means for oscillating said bar.

JAMES E. LOVE.

REFERENCES CITED

The following references are of record in the file of this patent:

UNITED STATES PATENTS

| Number | Name | Date |
|---|---|---|
| 1,644,563 | Brown | Oct. 4, 1927 |
| 1,857,699 | Smith et al. | May 10, 1932 |
| 1,881,411 | Love et al. | Oct. 4, 1932 |
| 1,996,294 | Hume et al. | Apr. 2, 1935 |
| 2,099,471 | Edgington | Nov. 16, 1937 |